April 19, 1927. Re. 16,602
R. G. RICHARDSON
AUTOMATIC TELEPHONE SYSTEM
Original Filed Feb. 14, 1916 3 Sheets-Sheet 1
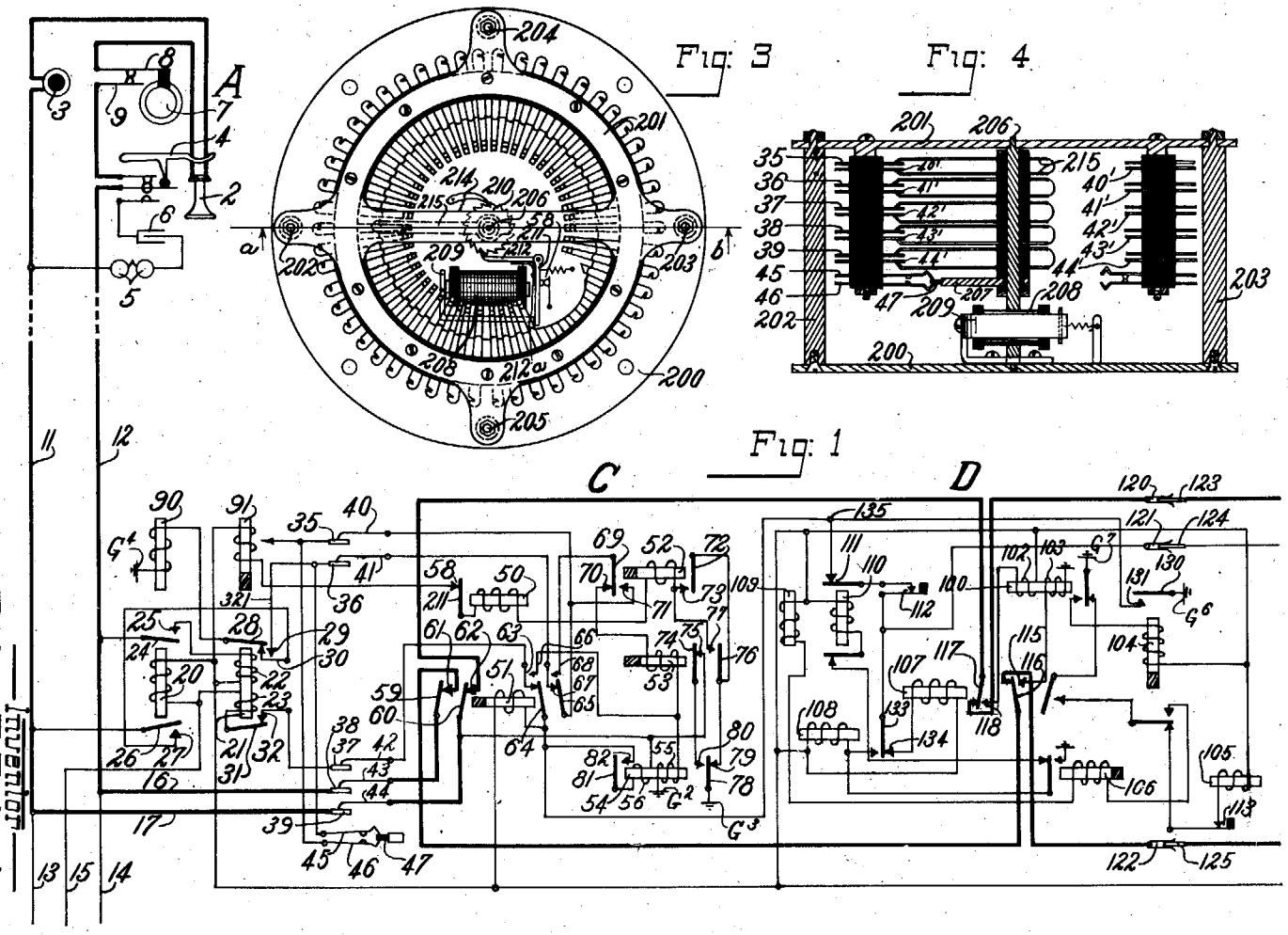
Inventor
Rodney G. Richardson
R. G. Richardson Atty.

April 19, 1927. Re. 16,602
R. G. RICHARDSON
AUTOMATIC TELEPHONE SYSTEM
Original Filed Feb. 14, 1916 3 Sheets-Sheet 2
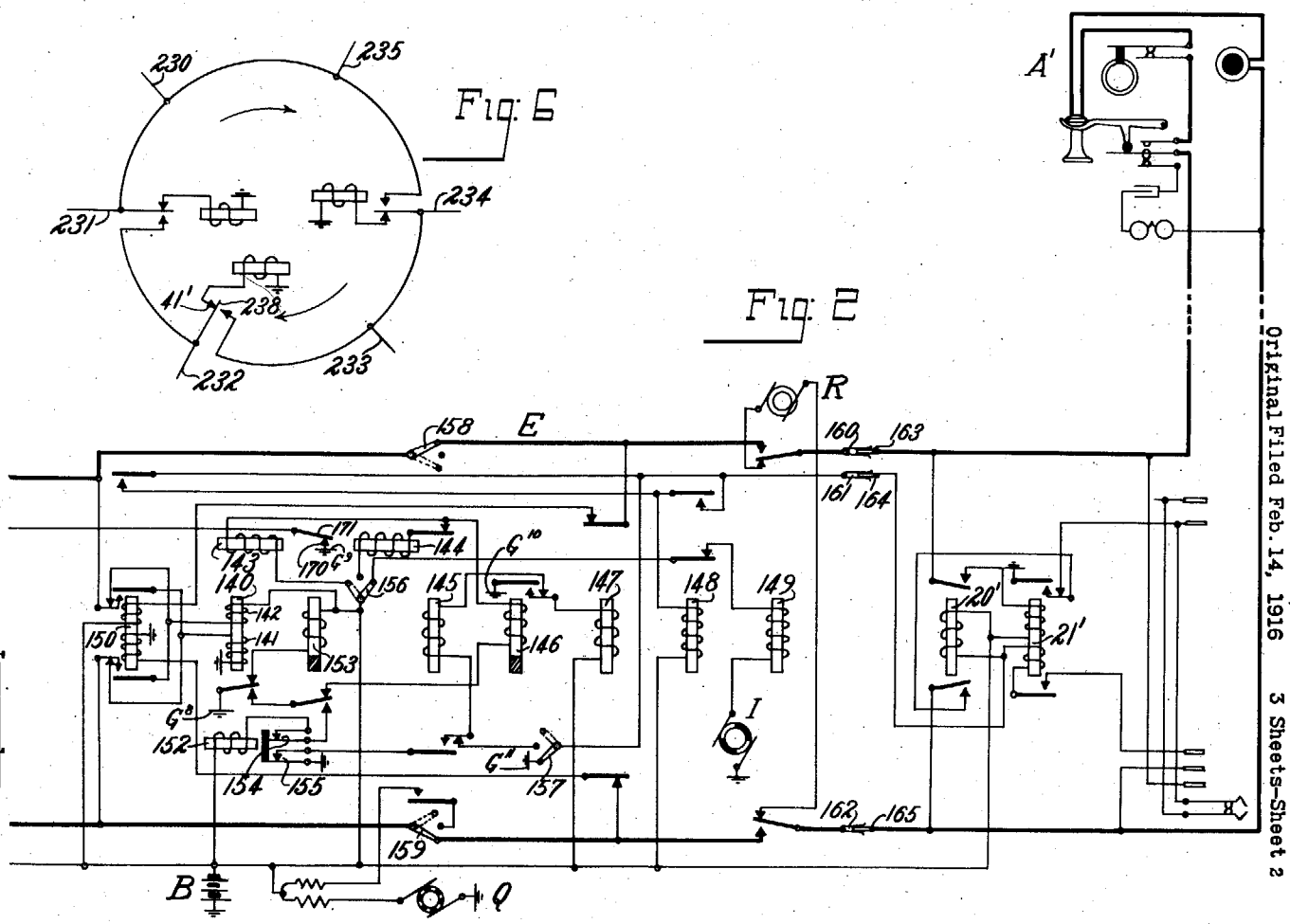
Inventor
Rodney G. Richardson
R G Richardson Atty.

April 19, 1927.
Re. 16,602
R. G. RICHARDSON
AUTOMATIC TELEPHONE SYSTEM
Original Filed Feb. 14, 1916 3 Sheets-Sheet 3
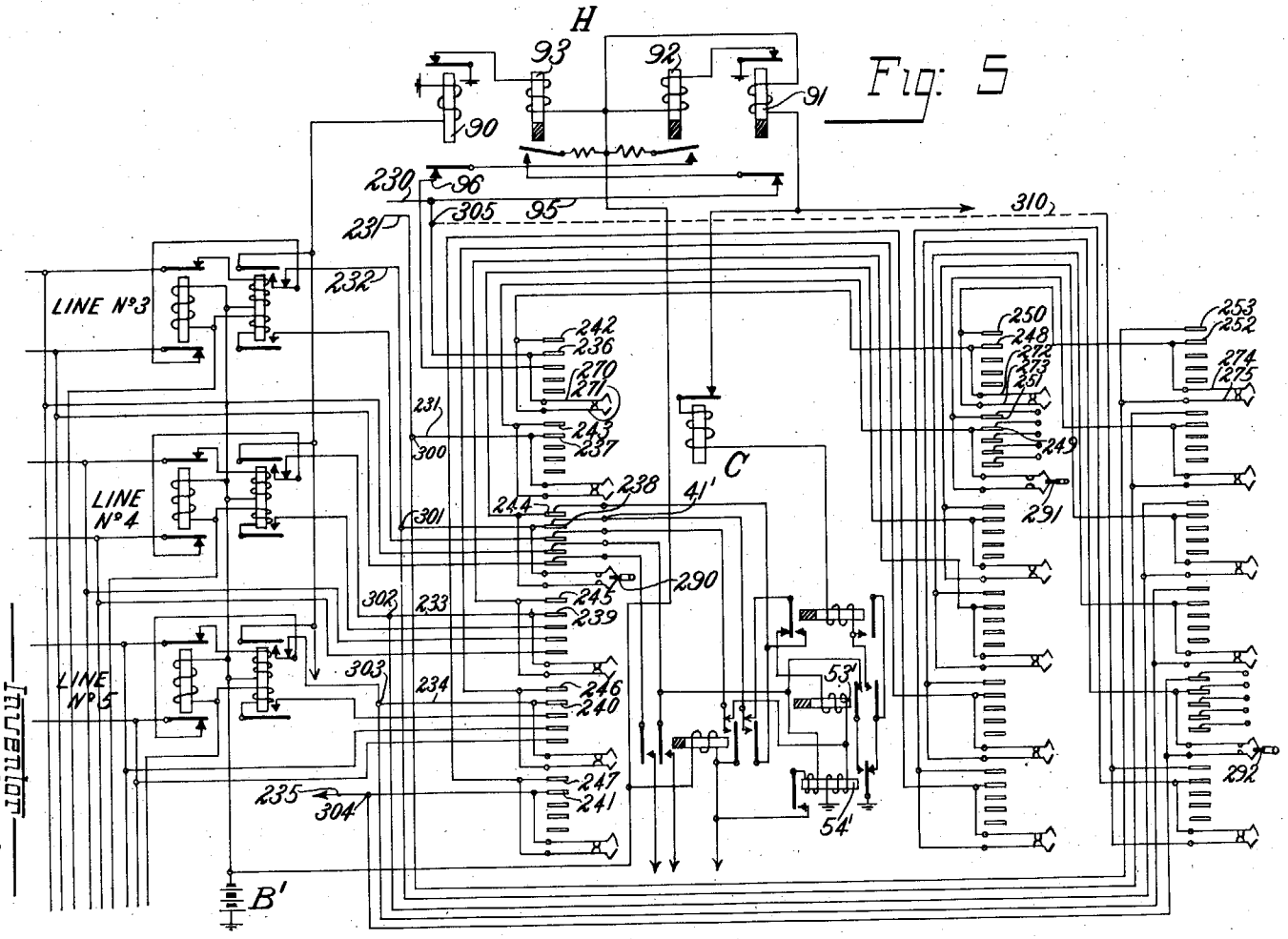
Inventor
Rodney G. Richardson
R. G. Richardson Atty.

Reissued Apr. 19, 1927. Re. 16,602

UNITED STATES PATENT OFFICE.

RODNEY G. RICHARDSON, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE.

AUTOMATIC TELEPHONE SYSTEM.

Original application filed February 14, 1916, Serial No. 78,161. Renewed June 26, 1920, Serial No. 392,042, now Patent No. 1,439,124, dated December 19, 1922. Divided and application filed November 6, 1922, Serial No. 599,176. Patent No. 1,492,396, dated April 29, 1924. Application for reissue filed April 21, 1926. Serial No. 103,654.

My invention relates to automatic telephone systems and as to its principal features relates more particularly to such systems as employ so called finder switches for connecting a calling line with a selector or connector switch.

In systems of the above general character the lines are divided into groups, and there is provided for each group of lines a sufficient number of finder switches to handle the maximum number of originating calls from that group. Each finder may be directly connected to a selector or connector switch, depending on the size of the system, through the medium of which a calling line, when located by a finder switch, may be extended into connection with a called line.

One of the features disclosed and claimed in this application, which is a division of my application Serial No. 78,161 filed February 14, 1916, renewed June 26, 1920, Serial No. 392,042, is an improved circuit arrangement according to which the line relay of a selector or connector switch to which a calling line is extended is energized over a local circuit for a brief interval independent of the calling line. This arrangement renders the line relay incapable of responding to accidental interruptions in the subscriber's line circuit which may occur during the removal of the receiver (known as false or preliminary impulses) and thus removes a source of trouble found in existing systems.

A further feature of the invention has to do with the trunk release circuits. According to this feature the release trunk conductor is grounded through a locking winding of an energized relay in one switch (a finder switch) to maintain the connection until ground is applied to the release trunk conductor at the next switch in the train (selector or connector). When this occurs the locking winding is short circuited and the energized relay in the first switch falls back. The holding of the connection during the change over from one switch to the next switch in the series is therefore made positive and reliable, as it is independent of the deenergizing time of a slow relay, as is the case with systems now in use.

To accomplish the foregoing and other useful ends my invention comprises means which will be hereinafter set forth and claimed, reference being had to the accompanying drawings.

In the drawings Figures 1 and 2, taken in order with the lines at the end thereof in alignment, represent diagrammatically a complete circuit connection between a calling substation A and a called substation A′, in a system embodying the principles of my invention. The said connection has been established through the medium of the finder switch C, the selector switch D, and the connector switch E. In Figure 3, I have shown a top view of the mechanism of the finder switch C, while Figure 4 represents a cross-section of Figure 3 on the line *a*, *b*. In Figure 5, I have shown the starting connections and a portion of the banks of three finder switches belonging to the same group. Figure 6 is a schematic representation of one of the circuits shown in Figure 5.

The substation A (Fig. 1) may be of the general type of substation shown in British patent to T. G. Martin No. 1,419 of 1910. As herein represented it consists of the receiver 2, transmitter 3, receiver hook 4, ringer 5, and condenser 6. Being an automatic substation it is also provided with a pair of impulse springs 8 and 9 controlled by the impulse wheel 7, which in turn is controlled through the medium of a finger hole dial (not shown). The impulse springs and wheel as shown herein may be arranged in the manner shown in British patent to S. G. S. Dicker 29,654 of 1910.

The line conductors 11 and 12 of the substation A have allotted to them at the exchange the line and cut-off relays 21 and 20; a set of multiple bank contacts in the bank of each finder switch, one of these sets being indicated by reference characters 35–39, inclusive; a pair of contact springs 45 and 46 associated with each set of finder bank contacts; and a set of multiple bank contacts (not shown) in the bank of each connector, such as connector E (Fig. 2), which has access to the group of lines of which the line of substation A is one. The normal conductors 13, 14, and 15 extend to the latter sets of bank contacts. The functions of the line and cut-off relays are very similar to the usual functions of these relays in other well known systems, although the line relay 21 in my system is somewhat different in operation as will appear more fully hereinafter. The bank contacts 37, 38, and 39 in the bank of finder switch C are multipled to corresponding contacts in the banks of all other finder switches in the group; each line of the group of which the line of substation A is one, of course, being multipled through the banks of these finders in the same manner. The bank contacts 35 and 36, however, and similar contacts of other lines of the group, are not multipled straight to corresponding contacts in the banks of other finders, as are contacts 37, 38, and 39, but are connected in a peculiar loop circuit which will be fully explained hereinafter.

The finder switch C may be briefly described as a rotary switch whose wipers have a movement in one direction only and have no normal position. Referring to Figures 3 and 4, the frame of the switch is formed of a circular base plate 200 and a ring shaped upper mounting plate 201, the two being separated the proper distance and rigidly connected by posts 202, 203, 204, and 205. Supported on bearings in the upper and lower frame plates, is a shaft 206 to which is rigidly secured an arm 207, a ratchet wheel 210, and five sets of wipers insulated from each other, one set being indicated by reference character 215. A magnet 208, attached to base plate 200 by means of the heel piece 209, is adapted, when energized, to rotate the shaft 206 through the medium of armature 211, pawl 212, and ratchet wheel 210. The spring 212[a] tends to hold the pawl 212 constantly in engagement with ratchet wheel 210. The dog 214, which also engages the ratchet wheel 210 serves to prevent backward rotation of the shaft 206.

The various sets of bank contacts are preferably arranged in a complete circle, and there are shown in Fig. 3 fifty of these sets, by which it appears that there will be fifty lines in the group to which the finder switch C has access. The exact number, however, is immaterial, it being easily possible and perhaps advisable to increase the number of lines in each group to one hundred. It is understood that the manner in which the finder switch banks and wipers are shown in Figure 1 is purely diagrammatic, the actual construction of these parts being as shown in Fig. 4. In the latter drawing the bank contacts 35–39, inclusive, correspond to the same numbered contacts in Figure 1 and are individual to a certain line. The bank contacts 40′–44′, inclusive, correspond to the wiper 40–44, inclusive, in Figure 1, and are preferably complete circular strips extending around the entire circumference of the bank. Attached to the strips 40′–44′, inclusive, are conductors which extend to the relays of the switch, shown at C (Fig. 1). It is evident that at all times a certain set of contacts such as contacts 35–39, inclusive, will be connected to the common strips 40′–44′, inclusive, by means of the five sets of wipers.

As before mentioned, each set of bank contacts has associated with it a pair of normally closed contact springs, one of these pairs being indicated by reference characters 45 and 46 (Figs. 1 and 4). The arm 207 carries an insulating piece 47 which is adapted to separate the pair of contact springs between which it happens to be resting. Or, in other words, no matter what set of bank contacts the wipers are resting on, the pair of contact springs associated with that set will be separated by the insulating piece 47.

Referring now to Fig. 5, I have shown diagrammatically therein six sets of bank contacts in each of three finder switch banks, together with six starting wires and their connections in the banks. The six sets of contacts immediately adjacent to the line and cut off relays at the left of the drawing are located in the bank of the first finder of the group, finder switch C; the six sets of contacts at the extreme right of the drawing are located in the bank of the last finder of the group (not shown); while the other six sets of bank contacts are located in the bank of an intermediate finder. It is to be understood that in actual practice there may be more than three finder switches in a group and that each finder, as already explained, will have fifty or even one hundred sets of contacts instead of six, but it is thought that sufficient contact sets and finder banks are represented to show what is intended. Counting from the top the three sets of finder switch wipers are shown resting, respectively on the third, second and fifth sets of contacts in their respective banks. The wipers when in motion move in an upward direction, as represented in Fig. 5.

The starting wires are indicated by reference character 230–235, inclusive. There are as many separate starting wires as there are lines in the group and each starting wire extends from the line relay of the line with which it is associated to the starting wire contact of that line in the bank of the first finder switch of the group. For example, starting wire 232 extends from a contact on the line relay of No. 3 line to bank contact 238, in the third set of contacts in the bank of the first finder switch. In the same manner, starting wire 233 extends from a contact on the line relay of line No. 4 to bank contact 239 in the fourth set of contacts in the bank of the first finder switch. Also, by referring to Figure 1, the starting wire 321 associated with the line of substation A is seen extending from contact 29 on line relay 21 to bank contact 36 in the bank of finder switch C, which is assumed to be the first switch of the group.

From the foregoing it will be clear that each line of a group is provided with an individual starting wire extending from its line relay to the bank of the first finder switch in the group. I will now explain how the various starting wires are connected in the banks of the remaining finder switches. Considering the starting wire 230, which is the one associated with line No. 1(not shown), a complete series circuit which includes every set of contact springs such as 45 and 46 (Figs. 1 and 4) in every finder switch may be traced as follows: starting wire 230, bank contact 236, contact springs 270 and 271, bank contact 242, bank contact 248, contact springs 272 and 273, bank contact 250, bank contact 252, contact springs 274 and 275, bank contact 253, wire junction 300, and starting wire 231 to bank contact 237. From this point the circuit may be traced more briefly by way of the second pairs of contact springs of the three finders in series to wire junction 301; thence by way of the third pairs of contact springs of the three finders in series to wire junction 302; thence by way of the fourth pairs of contact springs of the three finders in series to wire junction 303; thence by way of the fifth pairs of contact springs of the three finders in series to wire junction 304; and thence by way of the sixth pairs of contact springs of the three finders in series and the dotted conductor 310 to wire junction 305, where it joins starting wire 230 again and forms a complete loop. Conductor 310 is shown dotted to indicate that it passes through other pairs of contact springs not shown before returning to wire junction 305. The individual starting wires may be considered as taps taken off from the main loop circuit at the first finder switch bank. It will be observed that the above described loop circuit is divided into as many sections as there are finder switches by means of the insulating pieces 290, 291, and 292 which correspond to insulating piece 47 (Figs. 1 and 4). The finder switches may be considered as each standing, when idle, at the division point between two adjacent sections, each finder being adapted to serve those lines whose starting wires are tapped on to the section immediately in front of that finder. There may be but one starting wire attached to a given section or there may be many more, depending obviously on the position of the other finders.

For the sake of additional clearness I have shown in Figure 6, the loop circuit and six starting wires of Fig. 5, together with a starting relay in each of the three finders, all unnecessary details being omitted. When taken in connection with the foregoing description of Fig. 5, it is thought that Fig. 6 will be understood without difficulty.

The relays shown at H (Fig. 5) are common to a group of finder switches and may be termed emergency starting and stopping relays. Their functions will be more fully explained hereinafter. Returning now to Figure 1, the finder switch C is connected directly with the selector switch D which may be of the general type of selector switch disclosed in U. S. Letters Patent No. 815,321, granted March 13, 1906, to Keith, Erickson and Erickson; being, however, of the particular type disclosed in British patent to the Automatic Telephone Manufacturing Company, No. 2543 of 1914. Among other details the selector D comprises a bank of contacts arranged in horizontal rows or levels, which contacts are adapted to be engaged by a set of wipers 120, 121, and 122 carried upon a shaft (not shown) which has a vertical movement controlled by a vertical magnet 109, and a rotary movement controlled by a rotary magnet 110. The operation of the various parts of the switch is controlled through the medium of the double wound line relay 100. Means for permitting the switch to be restored to normal position is provided in the release magnet 105 which, upon energizing, withdraws the retaining pawls from the shaft. The contacts 112 and 113 make against their respective springs only when the shaft has been raised one or more steps from its normal position. The relays 104 and 106 are slow acting, i. e., each of these relays is able to retain its armature for an instant after its energizing circuit is broken.

As is well known, a selector of the type shown herein may be given access to a number of groups of connector switches, which connectors in turn have access to groups of subscribers' lines for the purpose of completing connections thereto. One of these connectors is shown a E, Fig. 2. The connector E may be of the general type of connector switch disclosed in U. S. Letters Patent No. 815,176 granted March 13, 1906, to Keith, Erickson and Erickson; being, however, of the particular type disclosed in British patent to the Automatic Telephone Manufacturing Company, No. 2270 of 1914. Among other details the connector E comprises a bank of contacts arranged in horizontal rows or levels, which contacts are adapted to be engaged by a set of wipers 160, 161, and 162, carried upon a shaft (not shown) which has a vertical movement controlled by the vertical magnet 143, and a rotary movement controlled by the rotary magnet 144. The usual side switch comprising the wipers 156, 157, 158, and 159 is controlled by the private magnet 147 in the well known manner. The operation of the various parts of the switch is controlled through the medium of the double wound line relay 140 which relay also serves to supply talking current to the calling line. A called line is furnished with talking current from the windings of the double wound answering bridge relay 150. The ringing relay 149 affords means for projecting ringing current over the called line to signal the called subscriber. Means for restoring the switch to normal position is provided in the release magnet 152, which, upon energizing, withdraws the retaining pawls from the shaft and restores the side switch wipers to their first position. The contacts 154 and 155 make contact with their respective springs only when the shaft has been raised one or more steps from its normal position. The relays 153 and 146 are slow acting.

The connector E has access through its wipers and bank contacts to a group of subscribers' stations one of which is shown at A′. The substation A′ may be similar in all respects to substation A and is provided with similar individual line equipment.

For supplying current for operating and talking purposes I have shown a battery B having one terminal grounded. The battery B′ shown in Fig. 5 may be the same battery or a different battery from that illustrated at B in Fig. 2. For supplying ringing current I have shown a generator R and for busy signaling purposes I have shown a busy signaling machine Q.

Having given a general description of the apparatus I will now proceed to describe the operation of a system embodying the principles of my invention. For the purposes of this explanation it will be assumed that the subscriber at substation A (Fig. 1) desires to establish a connection with the subscriber at substation A′ (Fig. 2). Inasmuch as a great deal of the automatic apparatus shown herein is old and well known in the art, having been fully described in the publications referred to, its operation will be described in a more or less general manner, the details being given only when they have to do in some way with the application of the principles of my invention.

Referring now to Fig. 1, the subscriber at substation A, upon removing his receiver to initiate the call, completes a circuit which includes a winding of line relay 21, individual starting wires 321, and a pair of starting relays in that finder switch whose wipers require the least movement in order to reach the contacts in its bank allotted to the line of substation A. Assuming that the wipers of finder switch C are already resting upon contacts individual to substation A, the above mentioned circuit may be traced as follows: ground at $G^2$, winding 55 of relay 54, winding of relay 53, contact 70, armature 69, contact 68, spring 67, wiper 41, bank contact 36, starting wire 321, contact 29, spring 30, contact 27, armature 26, line conductor 11, to and through substation A, line conductor 12, armature 24, contact 25, and winding 22 of line relay 21 to battery B. In response to current flow in the above path, relays 21, 53, and 54 attract their armatures. The armature of relay 21 is adjusted with a rather long stroke and the contact against spring 32 is made before spring 30 is separated from contact 29. As a result of the latter operation, which takes place near the end of the stroke, the original energizing circuit is broken, but not before relays 53 and 54 have fully attracted their armatures. Relay 21 is enabled to complete its stroke by reason of the new path to ground by way of common relay 90 closed by armature 28 and spring 30. A temporary locking circuit for relay 54 may now be traced as follows: ground at $G^2$, winding 55 of relay 54, contact 66, spring 63, wiper 42, bank contact 37, spring 32, armature 31, holding winding 23 of line relay 21, and winding of cut off relay 20 to battery B. The cut off relay 20, upon energizing, breaks the energizing circuit of winding 22 of line relay 21, but relay 21 retains its armature attracted by reason of its holding winding 23, now carrying current in series with the cut off relay winding.

An instant after the temporary locking circuit of relay 54 is established by the energization of relay 21, the slow acting relay 53 retracts its armature, thereby completing an energizing circuit for line switching relay 51 as follows: ground at $G^3$, armature 78, contact 80, armature 74, contact 75, holding winding 56 of relay 54, armature 81, contact 82, and winding of relay 51 to battery B. Relay 51, upon attracting its armatures, brings about the following circuit changes. By bringing armature 64 into engagement with spring 63 and by separating the latter from contact 66, the temporary locking circuit of relay 54 by way of its winding 55 is broken and relay 54 remains energized by reason of its low resistance holding winding 56. By the substitution of winding 56 for winding 55, the test contact 37 and its multiples are brought sufficiently near to ground potential to make the line of substation A busy to other finder switches that may be started. Also, by reason of the low resistance of holding winding 23 of line relay 21, the conductor 15 and the multiple test contacts in the banks of connector switches to which it extends are brought sufficiently near to ground potential to make the line of substation A busy to those connector switches. As a further result of the energization of relay 51 the wiper 41 is disconnected from relay 53 and is connected directly to wiper 40 in an obvious manner. This is done for the purpose of maintaining the continuity of the loop starting circuit while finder switch C is busy. Finally, by bringing armatures 59 and 60 into engagement, respectively, with contacts 61 and 62, relay 51 extends the line conductors 11 and 12 to the double wound line relay 100 of the selector D. Two energizing circuits for relay 100 may now be traced, one of which extends over the following path: ground at $G^5$, winding 103 of relay 100, contact springs 115 and 116, contact 61, armature 59, wiper 43, bank contact 38, conductor 16, line conductor 12, substation A, line conductor 11, conductor 17, bank contact 39, wiper 44, armature 60, contact 62, contact springs 117 and 118, and winding 102 of relay 100 to battery B. The second energizing circuit extends as follows: ground at $G^3$, armature 78, contact 80, armature 74, contact 75, armature 60, contact 62, contact springs 117 and 118, and winding 102 of relay 100 to battery B. Ordinarily the latter circuit, which is in effect a short circuit of winding 103 and the substation A, could be dispensed with. Its purpose will appear later.

Upon attracting its armature, the line relay 100 completes an energizing circuit for the slow acting relay 104, which relay, upon energizing, prepares circuits for the vertical and rotary magnets 109 and 110 in the well known manner and also completes a holding circuit which may be traced over the following path: ground at $G^6$ and contact springs 130 and 131 to armature 64, where the circuit divides, one branch extending by way of the winding of line switching relay 51 to battery B, and the other branch extending by way of spring 63, wiper 42, bank contact 37, spring 32, armature 31, winding 23 of relay 21, and winding of cut off relay 20 to battery B. It will be observed that as soon as the above holding circuit is established the winding 56 of relay 54 is short circuited. Upon deenergizing, relay 54 breaks the last described energizing circuit of line relay 100, thereby leaving the selector D under the control of the substation A.

The purpose of the auxiliary energizing circuit for line relay 100 may now be seen. Should the subscriber at substation A remove his receiver and replace it, in the interval between the pulling up of relay 21 and the pulling up of relay 104 of the selector, relay 54 would remain locked up by its winding 56, thereby maintaining the finder switch in a busy condition until the next call by substation A. The auxiliary energizing circuit for line relay 100 is provided to obviate this possibility.

It may also be pointed out at this time that in case the upper talking conductor or the release trunk conductor of the trunk line extending from the finder switch C to the selector D is open, then the holding circuit which is normally established by relay 104 cannot be completed, and relay 54 of the finder C remains locked up. If the upper talking conductor is open relays 100 and 104 cannot be energized and if the release trunk conductor is open, although relays 100 and 104 are energized, the energization of the latter is not effective to complete the holding circuit, due to the open condition. Relay 54, therefore, is not short circuited and remains locked up, as stated, through its left hand winding, which supplies current to relays 51, 21, and 20. Thus if the trunk line is open the finder C is maintained in connection with the calling line even after the subscriber at substation A hangs up his receiver, and this condition continues until a switchboard attendant notices the trouble and corrects it.

Before continuing with the operation of the selector D and connector E it will be well to consider the operation in the case where no finder switch is resting upon the contacts of the calling line. We will assume that the finder switch C is idle and that its wipers happen to be nearer to the contacts of the line of substation A than the wipers of any other finder. It follows then that the section of the starting loop to which starting wire 321 is tapped will terminate in the bank contact upon which wiper 41 is resting, as explained in connection with Fig. 5.

Upon the removal of the receiver at substation A an energizing circuit is completed as previously described for relays 21, 53, and 54, except that in this case the circuit includes a portion of the starting loop. Relay 21, upon energizing, prepares a circuit for the cut-off relay 20 by bringing armature 31 into engagement with spring 32, breaks the original starting circuit by separating contact 29 and spring 30, and locks itself by bringing armature 28 into engagement with spring 30, all as previously described. The instant spring 30 is separated from contact 29, relay 54 deenergizes but relay 53, being slow acting, retains its armature for an instant thereby completing the following circuit: ground at $G^3$, armature 78, contact 79, armature 76, contact 77, winding of relay 52, winding of rotary magnet 50, interrupter contact springs 58, and common relay 91 to battery B. Relay 52, upon attracting its armature 72 completes the above circuit over a path which is independent of the relay 53, whereby the deenergization of this relay an instant later is without effect.

As soon as the circuit just described is completed the rotary magnet 50 operates to vibrate its armature 211 by means of the interrupter contact springs 58, thereby rotating the wipers 40–44, inclusive, in search of the contacts of the calling line. Relay 52, being slow acting, retains its armature although its circuit is broken at each energization of magnet 50. During the rotation of the finder switch, wiper 41 is disconnected from relay 53 by the attraction of armature 69 of relay 52 and is connected at the same time to wiper 40 for the purpose of maintaining the continuity of the starting loop.

When wiper 42 arrives at bank contact 37 an energizing circuit is completed for relay 54 and cut-off relay 20 over the following path: ground at $G^2$, winding 55 of relay 54, contact 66, spring 63, wiper 42, bank contact 37, spring 32, armature 31, winding 23 of relay 21, and winding of cut-off relay 20 to battery B. The above circuit is the same as one previously described and referred to as the temporary locking circuit of relay 54. Upon attracting its armature, relay 54 breaks the rotary magnet circuit by separating armature 78 and contact 79, thereby stopping the rotation and bringing the wipers 40–44, inclusive, to rest upon contacts 35–39, inclusive. From this point the operation is the same as described in the case where it was assumed that the wipers of finder switch C were already resting upon the contacts of the line of substation A.

We may now return to the selector D and consider briefly its operation. In response to the manipulation of the dial at substation A in accordance with the first digit of the desired number, the impulse wheel 7 interrupts the circuit of the line relay 100 a number of times in the well known manner. As a result of these interruptions the line relay 100 is deenergized a corresponding number of times, sending an impulse at each deenergization from ground at $G^7$ to the slow acting relay 106 and the vertical magnet 109 in series. The vertical magnet, in response to these impulses, steps up the shaft until the wipers stand opposite the horizontal level in which are located contacts which are terminals of the desired group of connectors. The relay 106, being slow acting, retains its armature during the series of impulses and closes a circuit for the test relay 108 which latter relay prepares a circuit for the rotary magnet and locks itself to ground at $G^6$. At the end of the series of impulses the relay 106 deenergizes, thereby closing a circuit for the rotary magnet 110, whereupon the wipers 120, 121, and 122 start rotating in search of a trunk extending to an idle connector. As is well known, the rotary magnet interrupts its own circuit and also the locking circuit of the test relay at every energization, the contacts in the latter circuit, however, being short circuited by the test wiper 121 while passing over busy or grounded contacts. As soon, therefore, as the test wiper reaches an ungrounded test contact the test relay falls back and opens the rotary magnet circuit, thereby bringing the wipers to rest upon contacts which are terminals of a trunk leading to an idle connector switch, assumed in this case to be the connector E. As a further result of the deenergization of the test relay 108, a circuit is completed for the line switching relay 107, which relay, upon energizing, disconnects the extended line conductors 12 and 11 from the windings of the line relay 100 and further extends them by way of wipers 120 and 122 and bank contacts 123 and 125, to the double wound line relay 140 of the connector E.

The line relay 140 thereupon energizes over the previously traced circuit through substation A, and completes an energizing circuit for slow acting relay 153. Relay 153, upon energizing, prepares a circuit for the vertical and rotary magnets 143 and 144 and also completes a new holding circuit as follows: ground at $G^9$, contact springs 170 and 171, bank contact 124, and wiper 121 to wire junction 132, where the circuit divides, one branch extending by way of contact springs 133 and 134 and winding of line switching relay 107 to battery B, while the other branch extends by way of contact 112 and contact 111 to wire junction 135, where it joins the previously described holding circuit extending back to the finder switch C.

The subscriber at substation A may now operate his dial in accordance with the second digit of the desired number, resulting in this case in deenergizations of the line relay 140 of the connector E. At each deenergization the line relay 140 sends an impulse from ground at $G^8$ to the slow acting relay 146 and the vertical magnet 143 in series, side switch wiper 156 being in its first position. The vertical magnet, in response to these impulses, steps up the shaft until the wipers stand opposite the horizontal level in which are located contacts which are terminals of the line of substation A'. The relay 146 being slow acting, retains its armature during a series of impulses and maintains a circuit from ground at $G^{10}$ to the private magnet 147. At the end of the series of impulses the relay 146 and the private magnet deenergize, the latter controlling the side switch wipers in the usual manner, to advance them to their second position.

The subscriber at substation A may now operate his dial in accordance with the third and final digit of the desired number, resulting as before in deenergizations of the line relay 140. In this case, however, the line relay sends impulses to the slow acting relay 146 and the rotary magnet 144, side switch wiper 156 being in its second position. The rotary magnet operates in response to these impulses to rotate the wipers 160, 161, and 162 until they rest, respectively, upon contacts 163, 164, and 165, these contacts being terminals of the line of substation A′.

As side switch wiper 157 comes into engagement with its third position contact point, a circuit is completed from ground at $G^{11}$ by way of wiper 161, bank contact 164, and winding of cut-off relay 20′ to battery B. The cut-off relay 20′, upon energizing, disconnects the line conductors of substation A′ from their connections at the line relay 21′. Ground at $G^{11}$ also extends to multiples of contact 164 in the banks of other connectors of the group, thereby making the line of substation A′ busy to other calls.

By the engagement of side switch wipers 158 and 159 with their third position contact points the line conductors 11 and 12 are extended to the wipers 160 and 162, respectively, thereby completing the connection between the two substations. By the engagement of side switch wiper 156 with its third position contact point, a circuit is completed for the ringing relay 149 in series with the interrupter I, whereby ringing current is projected intermittently out over the line of substation A′ to signal the called subscriber.

The subscriber at substation A has now established the required connection with substation A′, and the bell at the latter substation is being rung to attract the attention of the subscriber. When the subscriber at substation A′ removes his receiver from the hook a circuit is completed for the double wound answering bridge relay 150, which relay serves to supply talking battery to the transmitter at substation A′. Relay 150, upon energizing, completes a circuit for the ring cut off relay 148, which relay locks up and breaks the circuit of the ringing relay 149, thereby stopping the ringing. As a further result of the energization of relay 150, the incoming line conductors are reversed as regards their connection with the windings of line relay 140. This operation is without importance in the system shown herein, although it is provided in case it is desired to operate meters or similar apparatus.

The calling and the called subscriber may now converse without further effort, the voice currents taking the path shown by the heavy lines.

Upon the completion of the conversation the subscribers will hang up their receivers. By the replacement of the receiver at substation A the circuit of line relay 140 is broken. Upon deenergizing relay 140 breaks the circuit of slow acting relay 153. Upon the deenergization of relay 153, the connector E is restored to normal in the regular manner and as a further result, ground is removed from the holding circuit extending back to selector D and finder switch C. The selector D is then restored to normal following the deenergization of relay 107, and line switching relay 51 of the finder switch C, line relay 21, and cut off relay 20 are deenergized, whereupon all the apparatus will have been restored to normal position. It should be mentioned that the line switching relay 51 is made slightly slow acting to insure that spring 63 will not make against contact 66 until after armature 31 of the line relay leaves spring 32. The reason for this adjustment is obvious.

The operation of a connector such as the connector E when the called line is busy is well known and has been fully described in the publications referred to. My invention involves nothing new in connection with this feature, consequently it is thought to be unnecessary to describe such operation here.

Referring now to Fig. 5, I will describe the operation of the relays shown at H which relays may be termed emergency starting and stopping relays. As implied above these relays perform no useful function in the ordinary operation of the system but are provided to care for extraordinary conditions. The relays 90 and 91 are of rather low resistance and are in series, respectively, with a common locking wire extending to all the line relays of the group of lines, and a common battery supply wire extending to the rotary magnets of all the finder switches of the group. The relays 92 and 93 are normally energized and are controlled, respectively, by the relays 91 and 90.

From the previous description of the operation of finder switch C, it will be clear that the line relay of a calling line is locked up by way of common locking conductor and relay 90 during the time a finder switch is rotating to find that line. Since the rotary magnets of all the finder switches of the group are in series with relay 91, it follows that in the ordinary operation of the system whenever relay 90 is energized relay 91 will be energized also.

Assume now that two subscribers whose starting wires happen to be tapped on to the same section of the starting loop remove their receivers at the same instant. It is evident that but one finder switch will be started. This finder will stop at whichever line it reaches first, whereupon relay 91 will deenergize, but relay 90 will remain energized since the second calling subscriber still has his line relay locked up. Relay 91, being slow acting, will pull up its armatures when the first impulse of current passes through it in series with the rotary magnet and retains its armatures until the finder switch comes to rest on the contacts of the calling line. The ungrounded pole of battery B′ is now connected to conductor 95 by way of back contact of relay 93 and back contact of relay 91. Conductor 95 is joined to the starting loop at some convenient point and affords means for starting another finder switch to locate the second calling line.

We will assume now that a subscriber removes his receiver and thereby starts a finder switch hunting for his line; but before the finder switch reaches his line, the receiver is replaced. By the replacement of the receiver the line relay of the calling line is deenergized and battery potential from the cut-off relays is removed from the multiple test contacts of that line in the finder switch banks. When, therefore, the finder which was started arrives at the contacts of the line in question, its test wiper finds no battery potential and the finder switch is unable to stop, but will continue to rotate indefinitely. I provide, however, a conductor indicated by reference character 96 which at this time will have battery potential upon it by way of back contacts of relays 90 and 92. Conductor 96 is joined to one or more multiple test contacts in the finder banks and affords means for stopping a rotating finder switch when there is no calling line waiting to be served.

It will be seen from the foregoing that I have provided a very efficient method of starting finder switches in a system of the general type described, by which the movement of the finders is reduced to a minimum; and it will be seen further that I have provided certain new and advantageous circuit arrangements for accomplishing the foregoing and other beneficial results, thereby tending to increase the general serviceability of a finder switch system.

While I have described in the foregoing certain specific embodiments of my invention, I do not wish to be held strictly to the forms shown herein, for various adaptation will no doubt suggest themselves to persons skilled in the art. I desire, therefore, to include and have protected by Letters Patent all forms and modifications of my invention which may come within the scope of the appended claims.

I claim:

1. In a telephone system, a line, an automatic switch, a controlling relay for said switch, a finder switch operable for extending said line into connection with the controlling relay of said switch to complete a circuit therefor, said controlling relay remaining deenergized until the line is found, and means in said finder switch responsive to the finding of said line for completing a preliminary energizing circuit for said controlling relay.

2. In a telephone system, a line, an automatic switch, a controlling relay for said switch, a finder switch operable for extending said line into connection with the controlling relay of said switch to complete a circuit therefor, means in said finder switch for completing a second circuit for said controlling relay, and means under the control of said relay for breaking said second circuit.

3. In a telephone system, an automatic switch, a trunk line terminating in said switch, a line relay in said switch bridged across the said trunk line, means for connecting a calling line with said trunk line, means effective when the connection is established for automatically completing a local circuit for said relay over a talking conductor of said trunk to energize the said relay independent of the calling line, and means for opening said local circuit after a predetermined time interval.

4. In a telephone system, an automatic switch, a trunk line terminating in said switch, a line relay in said switch bridged across the said trunk line, means for extending a calling line to said trunk line, means for automatically completing a local circuit for said relay over a talking conductor of said trunk to energize the said relay independent of the calling line, and means operated responsive to the closure of said local circuit for opening said local circuit.

5. In a telephone system, a trunk line, an automatic switch in which said trunk terminates, means for extending a calling line to said trunk, a relay connected to said trunk and adapted to be energized over the two sides of the calling line in series, means actuated when the calling line is extended to said trunk for automatically closing a local circuit for said relay including a talking conductor of said trunk, and means controlled by said relay for opening said local circuit.

6. In a telephone system, a calling line and a called line, a switch controlling device on said calling line, means including a subscriber controlled automatic switch for extending a connection from said calling line to said called line, means responsive to an initiation of a call by a subscriber on said calling line for connecting said calling line and said switch together whereby said switch is placed under the control of said switch controlling device, and means at the exchange for closing a shunt around said switch controlling device for an interval after the connection is established.

7. In a telephone system, a calling line, trunk lines, an automatic switch controlled over the calling line to connect the same with an idle trunk line, a locking circuit for retaining said switch in operated position established when the line and trunk are connected, and means operated automatically and independent of the calling line for opening said locking circuit.

8. In a telephone system, a calling line, trunk lines, an automatic switch controlled over the calling line to connect the same with an idle trunk line, a locking circuit for retaining said switch in operated position established when the line and trunk are connected, a relay connected to each trunk, means for closing a local energizing circuit for the relay associated with the trunk in use, and means controlled by said relay for opening said locking circuit.

9. In a telephone system, a trunk line terminating in an automatic switch, a line relay in said switch bridged across the talking conductors of said trunk line in series with the exchange battery, a second switch for connecting a calling line with said trunk line, and means in said second switch for automatically connecting one of the talking conductors of said trunk line to ground to energize said line relay independent of the calling line.

10. In a telephone system, a trunk line, terminating in an automatic switch, a line relay in said switch bridged across the talking conductors of said trunk line in series with the exchange battery, a second switch for connecting a calling line with said trunk line, and means in said second switch for grounding one of the talking conductors of said trunk line and for maintaining said conductor grounded for an interval after the connection is established, whereby the placing of the said line relay under the control of the calling line is automatically delayed.

11. In a telephone system, a trunk line, terminating in an automatic switch, a line relay in said switch bridged across the talking conductors of said trunk line in series with the exchange battery, a second switch for connecting a calling line with said trunk line, a local circuit for said line relay including one conductor of said trunk line, and means in said second switch for maintaining said local circuit closed for an interval after the connection is established.

12. In an automatic telephone system, two serially related automatic switches for use in connecting a calling and a called line, a trunk line extending between said switches, a release trunk conductor included in said trunk line, means in the first switch for grounding said conductor, means in the second switch for grounding said conductor thereafter, and means in said first switch responsive to the grounding of said conductor in the second switch for removing the ground in the first switch.

13. In a telephone system, two serially related automatic switches for use in connecting a calling and called line, a trunk line extending between said switches, said trunk line including a release trunk conductor, a self locking relay in the first of said switches having a locking winding through which a holding ground is supplied to said conductor, and means for grounding said conductor in the second of said switches, whereupon the said locking winding is short circuited and the relay is deenergized to open its locking circuit.

14. In a telephone system, a subscriber's line, two serially related automatic trunking switches for extending said line when calling, a trunk line extending between said switches, said trunk line including a release trunk conductor, a cut-off relay for said line, a holding circuit for said relay including said conductor, a locking relay in the first of said switches having a locking winding through which a holding ground is supplied to said conductor to maintain the cut-off relay energized, and means for grounding said conductor at the second of said switches, whereupon said locking winding is short circuited and the said locking relay is deenergized to interrupt its locking circuit.

15. In a telephone system, a line, two serially related automatic switches for extending said line when calling, a cut-off relay for said line, a self locking relay in the first of said switches, a circuit for said cut-off relay including the locking winding of said locking relay, and a relay in the second of said switches for shunting said locking winding by completing said circuit over a different path.

16. In a telephone system, a line, a trunk line, an automatic switch for connecting said line and trunk line, a switching relay in said switch for closing the connection, a release trunk conductor over which said switching relay is maintained energized, a relay in said switch having a locking winding through which a battery potential is applied to said conductor, and means in said trunk line operative after the connection is established for placing substantially the same battery potential on said conductor whereby said locking relay is shunted and deenergized.

17. In a telephone system, a train of automatic serially related switches for connecting a calling and a called line, a release trunk conductor for maintaining said switches in operated position, a relay in one switch having a locking winding for supplying ground to a section of said conductor for an interval during the setting up of the connection, and a relay in a succeeding switch for directly grounding said conductor to short circuit and deenergize said first relay.

18. In a telephone system, two serially related automatic switches for setting up a connection, a switching relay in the first switch for closing the talking circuit at said switch, a second relay in said switch having an energizing winding and a locking winding, means for closing a temporary circuit through the energizing winding, a circuit for said switching relay including contacts of said second relay and its locking winding, and a relay in said second switch for shunting said locking winding.

19. In a telephone system, an incoming line, a plurality of outgoing lines, automatic switching mechanism for interconnecting said incoming line with any of said outgoing lines, a holding circuit completed when said incoming line is connected to one of said outgoing lines, means in said holding circuit for temporarily bringing together the two sides of a seized outgoing circuit, means responsive to said operation for initiating the release of said seized outgoing circuit, and other means normally effective to prevent said releasing operation.

20. In a telephone system, an incoming line, a plurality of outgoing lines, a switch for interconnecting said incoming line with one of said outgoing lines, an impulse relay connected to one side of the connected outgoing line, a holding circuit for said switch established when the connection between the incoming and outgoing lines is completed, a slow releasing relay in said holding circuit, means controlled by said slow releasing relay for closing the operating circuit of said impulse relay independent of said incoming line, means responsive to the operation of said impulse relay for initiating the release of said outgoing line, and other means including a second energizing circuit for said impulse relay extending through said incoming line for preventing said releasing operation.

21. In a telephone system, a calling line, trunk lines, an automatic switch controlled over the calling line to connect the same with an idle trunk line, means operating automatically and independently of the calling line to initiate the release of the connected trunk line, and means normally controlled over the calling line for preventing such releasing operation.

22. In a telephone system, a calling line, trunk lines, an automatic switch controlled over the calling line to connect the same with an idle trunk line, means for temporarily holding said connection independent of the calling line, means operating automatically to disable said holding means to break the connection, and means normally effective to prevent the breaking of the connection in case the calling subscriber continues with the call.

23. In a telephone system, a calling line, trunk lines, an automatic switch controlled over the calling line to connect the same with an idle trunk line, means for temporarily holding said connection independent of the calling line, means for transferring the control of the holding means to the calling line in case the calling subscriber continues with the call, and means operated automatically for disabling said holding means to release the connection in case the calling subscriber hangs up his receiver before the control of the holding means is transferred.

24. In a telephone system, a trunk line terminating in an automatic switch, means for operating said switch controlled by a calling subscriber over the two sides of said trunk line in series, a second switch for connecting a calling line to said trunk line to enable the said first switch to be operated as set forth, subscriber controlled means for releasing the second switch to disconnect the calling line and trunk line, and automatic means for preventing the release of the second switch in case the trunk line is defective.

25. In a telephone system, trunk line comprising two talking conductors and a release trunk conductor, means for connecting a calling line with said trunk line, means associated with the trunk line for closing a holding circuit for the connecting means including said release trunk, and means for locking the connecting means to prevent disconnection of the line and trunk line in case the holding circuit is not established.

26. In a telephone system, two serially related switches operable successively to set up a connection, a trunk line extending between said switches, means in the second switch effective to prevent the release of the first switch in case the trunk line is in order, and means in the first switch effective to prevent its release in case the trunk line is out of order.

27. In a telephone system, a trunk line, means including an automatic switch for connecting a calling line with said trunk line, a relay in said switch for preventing the release thereof, and means for locking said relay energized in case the said trunk line is open.

28. In a telephone system, a trunk line, an automatic switch for connecting a calling line with said trunk line, releasing means for said switch, local means for controlling said releasing means independent of the calling line, and means for transferring the control of said releasing means to the calling line in case said trunk line is in working order when connected with.

Signed by me at Chicago, Illinois, this 16th day of April, 1926.

RODNEY G. RICHARDSON.